United States Patent
Seel et al.

(10) Patent No.: US 6,644,710 B2
(45) Date of Patent: Nov. 11, 2003

(54) BOX CONTAINER AND LOADING SPACE FOR A MOTOR VEHICLE

(75) Inventors: Holger Seel, Aidlingen (DE); Werner P. Schlecht, Vaihingen/Enz-Aurich (DE)

(73) Assignee: BOS GmbH & Co. KG

( * ) Notice: Subject to any disclaimer, the term of this patent is extended or adjusted under 35 U.S.C. 154(b) by 0 days.

(21) Appl. No.: 10/191,255

(22) Filed: Jul. 8, 2002

(65) Prior Publication Data

US 2002/0185507 A1 Dec. 12, 2002

Related U.S. Application Data

(63) Continuation of application No. 09/703,367, filed on Oct. 31, 2000, now abandoned, which is a continuation of application No. 09/375,168, filed on Aug. 16, 1999, now abandoned.

(30) Foreign Application Priority Data

Aug. 18, 1998 (DE) .......................................... 19837278

(51) Int. Cl.[7] .................................................. B60R 9/00
(52) U.S. Cl. ................ 296/37.5; 296/37.14; 296/37.16; 224/497; 224/539
(58) Field of Search ............................. 296/37.14, 37.5, 296/24.1, 37.16; 224/539, 542, 497–499, 527; 217/14, 15, 46, 47; 220/6

(56) References Cited

U.S. PATENT DOCUMENTS

| | | | |
|---|---|---|---|
| 1,179,445 A | * 4/1916 | Manning | 296/37.5 |
| 1,202,253 A | * 10/1916 | Vitt | 220/6 |
| 1,769,019 A | 7/1930 | Flagstad | |
| 2,470,314 A | * 5/1949 | Lim | 296/26.1 |
| 2,512,522 A | 6/1950 | Denny | |
| 2,532,833 A | * 12/1950 | Cella | 217/14 |
| 2,654,498 A | * 10/1953 | Jennison | 217/14 |
| 2,788,910 A | * 4/1957 | Klemming | 217/15 |
| 3,186,585 A | 6/1965 | Denny | |
| 3,254,786 A | * 6/1966 | Melville | 220/6 |
| 3,393,936 A | * 7/1968 | Hall | 296/24.1 |
| 3,659,894 A | * 5/1972 | Dodgen et al. | 296/165 |
| 3,796,342 A | 3/1974 | Sanders et al. | |
| 4,226,348 A | 10/1980 | Dottor et al. | |
| 4,508,237 A | 4/1985 | Kreeger et al. | |
| 4,718,584 A | 1/1988 | Schoeny | |
| 4,720,020 A | 1/1988 | Su | |
| 4,733,898 A | * 3/1988 | Williams | 296/24.1 |
| 4,913,302 A | 4/1990 | Stonier | |
| 4,936,624 A | * 6/1990 | West | 296/37.6 |
| 5,038,953 A | 8/1991 | Radar | |
| 5,064,068 A | 11/1991 | Sheng | |
| 5,080,417 A | * 1/1992 | Kanai | 359/275 |
| 5,107,639 A | 4/1992 | Morin et al. | |
| 5,429,261 A | 7/1995 | Machino | |
| 5,464,264 A | * 11/1995 | Wilson | 296/37.6 |
| 5,599,054 A | * 2/1997 | Butz et al. | 296/37.8 |
| 6,015,071 A | * 1/2000 | Adomeit et al. | 220/6 |
| 6,050,202 A | 4/2000 | Thompson | |
| 6,053,553 A | * 4/2000 | Hespelt | 296/37.5 |
| 6,056,177 A | * 5/2000 | Schneider | 224/401 |
| 6,254,162 B1 | * 7/2001 | Faber et al. | 224/497 |

FOREIGN PATENT DOCUMENTS

| | | |
|---|---|---|
| DE | 196 50 767 A1 | 7/1998 |
| GB | 548289 | * 10/1942 |
| GB | 2 277 723 A | 11/1994 |

* cited by examiner

*Primary Examiner*—Nathan J. Newhouse
(74) *Attorney, Agent, or Firm*—Greenberg Traurig, P.C.

(57) ABSTRACT

A box container and loading space for a motor vehicle are provided, in which the box container is provided with wall parts that are parallelogrammatically movably mounted around axes parallel to each other relative to one another between a collapsed inoperative position and a mounted or erected operational position, particularly for use in passenger vehicles.

10 Claims, 4 Drawing Sheets

Figure 1:
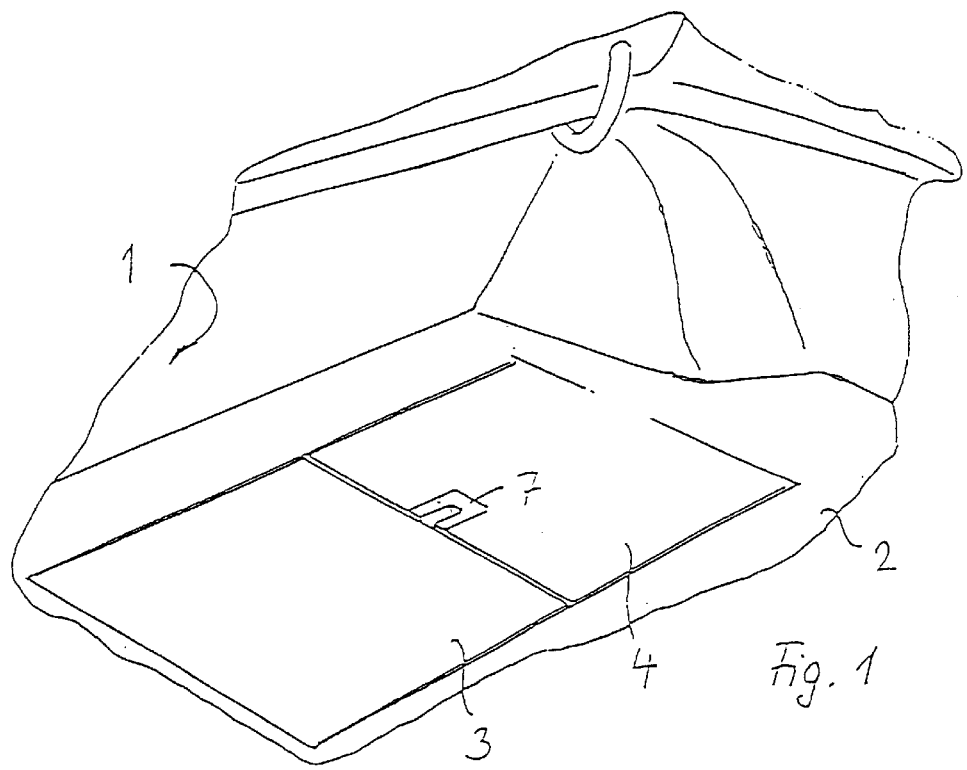

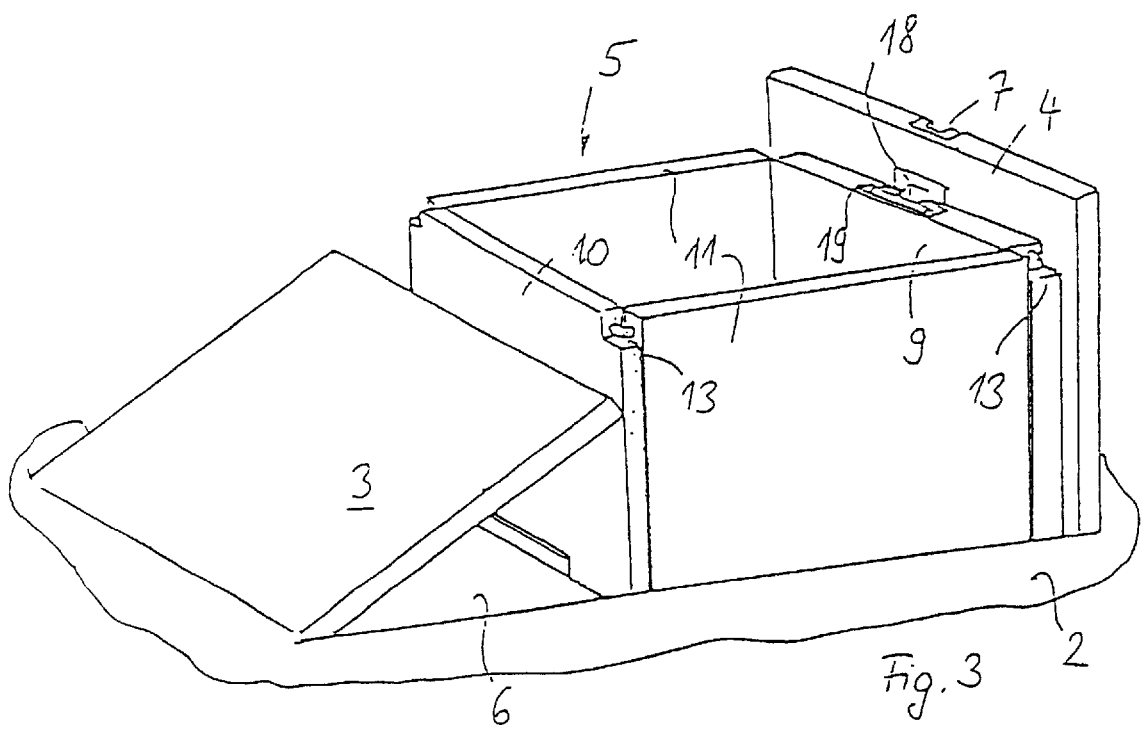
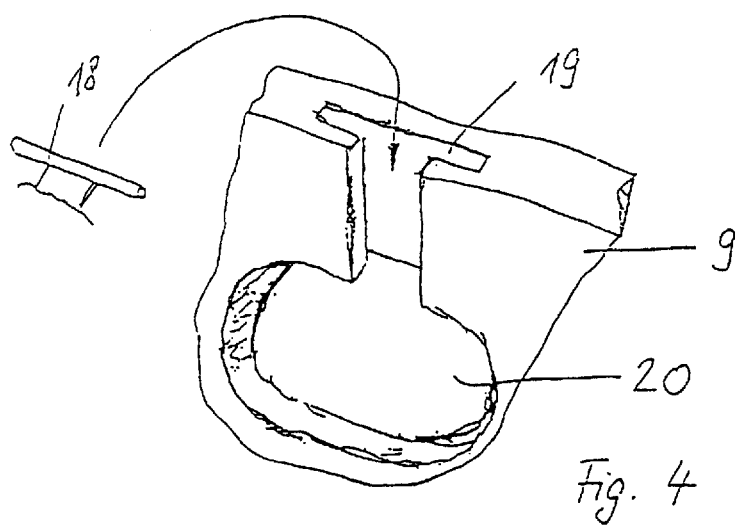

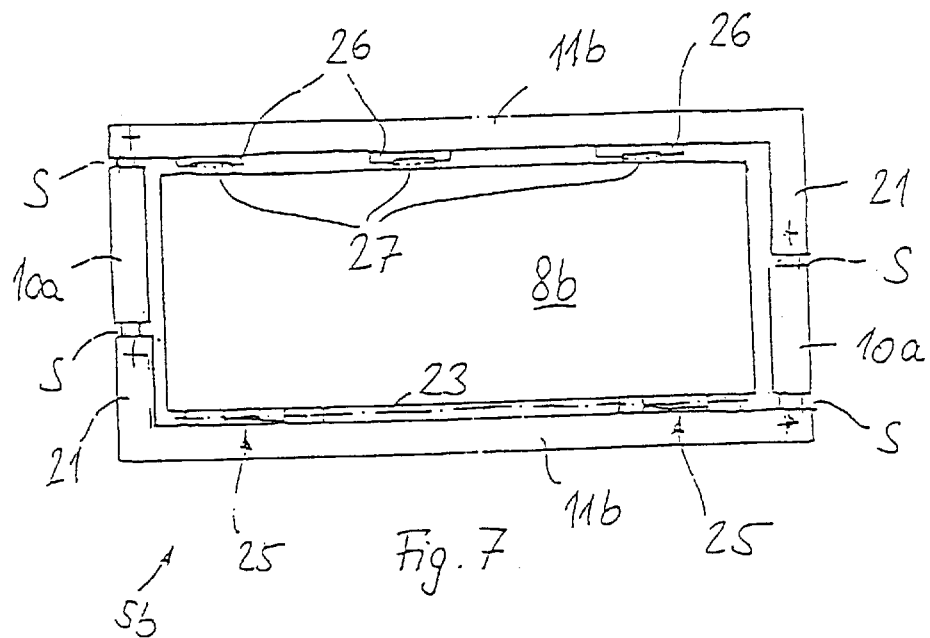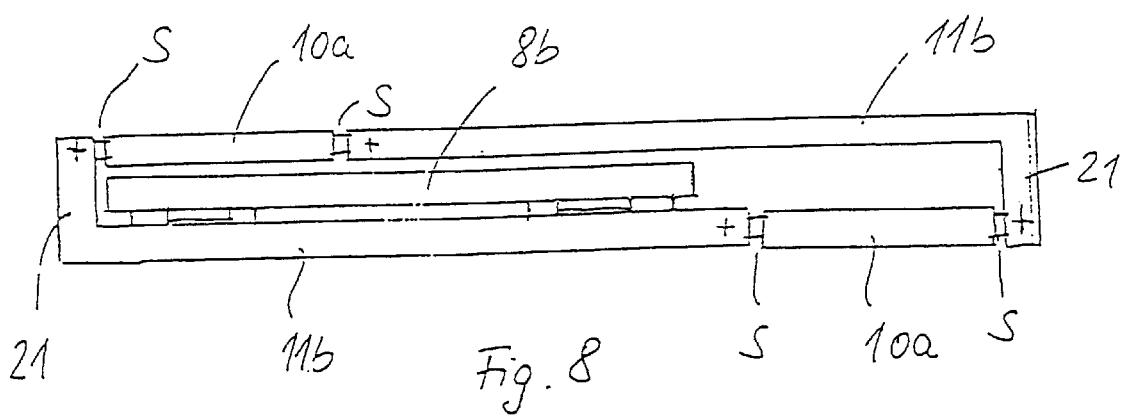

BOX CONTAINER AND LOADING SPACE FOR A MOTOR VEHICLE

This application is a continuation of application Ser. No. 09/703,367 filed on Oct. 31, 2000, now abandoned, which is a continuation of application Ser. No. 09/375,168 filed on Aug. 16, 1999, now abandoned.

BACKGROUND OF THE INVENTION

The invention relates to a box container, in particular for use in a loading space of a motor vehicle, with several dimensionally stable wall parts allocated to a container floor and four container sides.

The invention also relates to a loading space for a motor vehicle with a loading space floor that exhibits at least one recess which can be closed on by means of a covering.

Box-shaped containers exhibiting a floor and four side walls rising from the floor are generally known to the art. It is also customary to transport such box-shaped containers in a loading space of a motor vehicle with a notchback or slopeback. Such containers can be used to accommodate small articles which, in the absence of storage compartments or similar in the loading space of a motor vehicle, can be stowed in this container. Such a container, however, is bulky and takes up too much room, should its function as a storage receptacle not be or only partially be required.

In addition thereto it is customary to provide at least one stationary storage compartment in a loading space floor. The storage compartment is formed by a recess in the loading space floor. The recess can be closed off by a cover terminating flush with the loading space floor in the closed state. Such recesses serving as storage compartments are state of the art technology, in particular for utility van-passenger vehicles. That they are suited solely to accommodate small articles and products left in the motor vehicle is a drawback of such stationary storage compartments. Such storage compartments cannot fulfill the functions of a box container which can be removed from the motor vehicle, which box container is particularly suited to accommodating shopping items and to transporting these items between the motor vehicle and residence or purchasing site.

It is therefore the task invention to create a box container and a loading space of the kind designated at the outset which exhibit improved application potential vis-à-vis the state of the art.

For the box container this task is solved in that the wall parts are parallelogrammatically sluably mounted around axes parallel to each other relative to one another between a collapsed inoperative position and a mounted operational position. When not needed, the box container can consequently be collapsed, saving space, and stowed at a suitable location. This is particularly advantageous with the use of the box container in a motor vehicle. The parallelogrammatic mounting of the box container into the operational position and its lowering into the inoperative position can occur in an extremely time-saving manner through a single manipulation because the different wall parts in each case are connected to each other and through a swiveling of a single wall part necessarily also effect a swiveling of the other wall parts.

In a refinement of the invention, in the mounted operational position at least one wall part is additionally sluably mounted around a transverse axis vis-à-vis the adjacent wall parts in such a way that the wall parts jointly form the box shape from the container floor and four container sides. After mounting of the paragrammatically movable wall parts which, the wall part, forming at least one remaining container side or a container floor is consequently correspondingly transversely folded out, whereby the final box shape results. This construction has the advantage vis-à-vis the solution also in accordance with the invention of not separately employing at the corresponding location wall parts which copivot upward after the raising of the parallelogrammatically connected wall parts, that the entire box container is functionally mounted with a single movement of the hand and, consequently, in one motional sequence. By virtue of the fact that all wall parts are connected to each other, the loss of and one or more separate wall parts is effectively avoided.

In a further refinement of the invention, at least one wall part is excentrically mounted vis-à-vis its point of gravity about the transverse axis in such a manner that in the mounted operational position it swivels through its own weight into its final box-completing position. The manual swiveling possibly required of these wall parts sluable around two axes is eliminated by this construction.

In a further refinement of the invention, position-locking means are allocated to at least the one wall part additionally sluable around a transverse axis, by means of which the wall part is securable in its mounted end position relative to at least one adjacent wall part. Position-locking means can be provided on the respective corresponding wall parts, in each case supplementing each other. In the event the different wall parts are exactly dimensioned with correspondingly minimum tolerances, the wall parts can already be adequately stabilized against each other in the mounted box shape also on the basis of corresponding detents. The refinement described here, however, has the advantage of dispensing with such narrow tolerances and high fabrication precision entailed by the additional locking means, without impairing the stability and operation of the box container in its mounted operational position.

In a further refinement of the invention, the wall parts are parallelogrammatically sluably mounted to each other around vertical axes. This refinement is particularly advantageous if the four wall parts forming the container sides are correspondingly parallelogrammatically movable relative to each other. At least one wall part forming the container floor can be separately used or also connected to the wall parts forming the container sides. In the latter case; the wall part forming the container floor, in accordance with a further refinement of the invention, is additionally mounted around a horizontal axis between two wall parts respectively forming one container side. In all cases, the terms horizontal and vertical refer to the positioning of the box container on a level, horizontal substratum. The container floor can be formed by two wall parts which, in each case, are correspondingly sluably articulated on opposing sides. In an identical manner the container floor can, however, also be formed only by a single wall part mounted on a container side between the corresponding wall parts.

In a further refinement of the invention, two wall parts, facing each other and forming container sides, are provided with mutually opposing diagonal angle prolongations on which the adjacent wall parts are articulated, whereby the length of the angle prolongations is proportioned to the thickness of at least one interposing wall part in the collapsed position. Complete collapse to the lowest height possible can be achieved thereby. The length of the angle prolongations has been proportioned to the thickness of at least one interposing wall part such that the overlying wall part and the underlying wall part almost immediately bear on each other.

The task in accordance with the invention for the loading space is solved in that the recess is dimensioned in such a way that a box container in accordance with the invention can be incorporated into the recess in the inoperative position. The box container can thereby be space-savingly accommodated. If the box container is needed to transport items to be loaded, the recess can serve as an additional storage compartment for articles remaining stationary in the vehicle.

In a refinement of the loading space in accordance with the invention the cover exhibits at least one swivel lid which is connected via a mechanical coupling to at least one wall part in such a way that one opening of the swivel lid effects mounting of the box container. Fast and simple mounting of the box container already with the opening of the swivel lid is attained thereby, such that, with a few manipulations, the corresponding functions of the box container and the recess are achievable.

In a further refinement of the invention, the mechanical coupling is arranged in a releasable manner between the swivel lid and the wall part. This construction guarantees that the coupling between swivel lid and box container is only temporarily present during the mounting process. The unrestricted mobility and removability of the box container from the vehicle is not thereby interfered with.

In a further refinement of the invention, at least one swivel lid can be raised into grasping position by means of a support lever configuration. The support lever configuration represents an opening aid in order to be able to easily and quickly grasp the swivel lid terminating flush with the loading space floor in the closed position.

In a further refinement of the invention, at least one support element is provided on one floor of the recess and/or on at least one swivel lid, which, when the recess is empty, creates a swivel lid support flush with the floor. This refinement is advantageous if the recess to support the swivel lid does not exhibit a frame of its own in the closed position but, rather, the dimensions of the swivel lid correspond to the dimensions of the box container in the collapsed inoperative position. In order to prevent at least one swivel lid, when the box container is removed, from extending obliquely inward to the floor of the recess in its subsequent, closed-again position, at least one support element guarantees secure support of the swivel lid, such that the swivel lid forms a flush termination with the remaining loading space floor. The level and uniform overall impression of the loading space floor is consequently not impaired even when the box container has been removed.

In a further refinement of the invention, in conformity with at least one support element, at least one centering recess is provided on the container floor of the box container by means of which a defined positioning of the box container in the recess is achievable. Centering and securing of the box container in its collapsed inoperative position inside the recess is thereby enabled. As a result thereof, it is possible to secure the box container, in particular in its collapsed inoperative position, in the recess. The box container can also be securely positioned in the mounted operational position in the loading space by a support element and centering recess.

Loading space, as defined in the invention, is understood to mean a trunk of a passenger vehicle with notchback as well as a loading space of a utility van-passenger vehicle or a passenger vehicle with hatch- or slopeback, with the result that loading spaces in accordance with the invention can be closed off by tailgates as well as by taildoors. Truck and delivery vehicle loading spaces are also numbered among the vehicles invention.

Further advantages and characteristics invention result from the claims as well as from the following description of preferred exemplified embodiments of the invention depicted with the help of the drawings.

Figure 2:
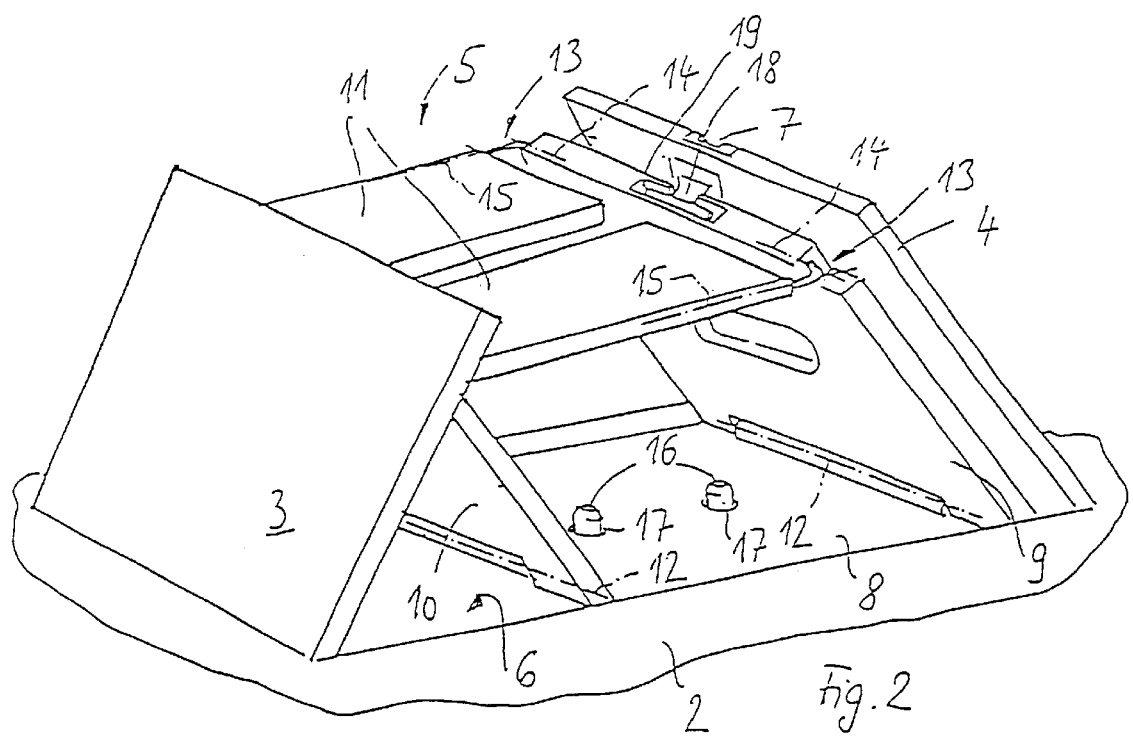
Figure 5:
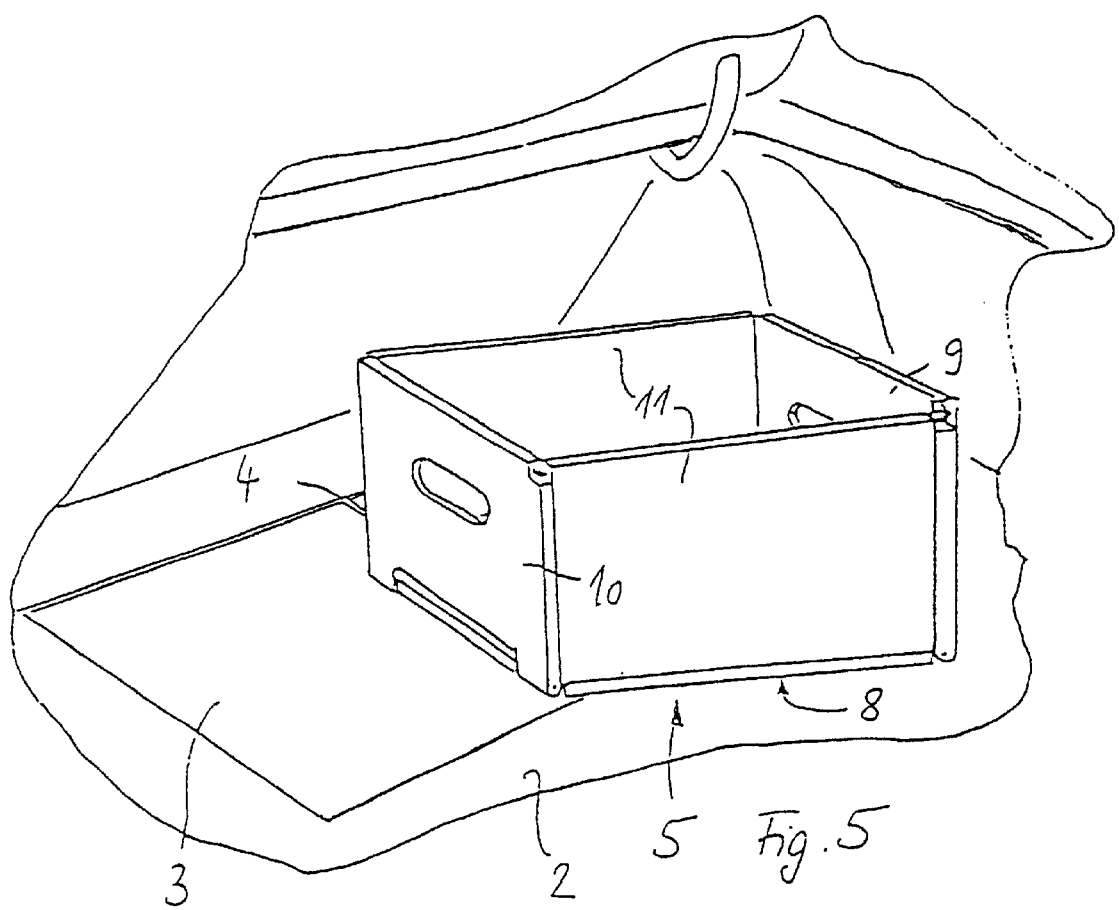
Figure 6:
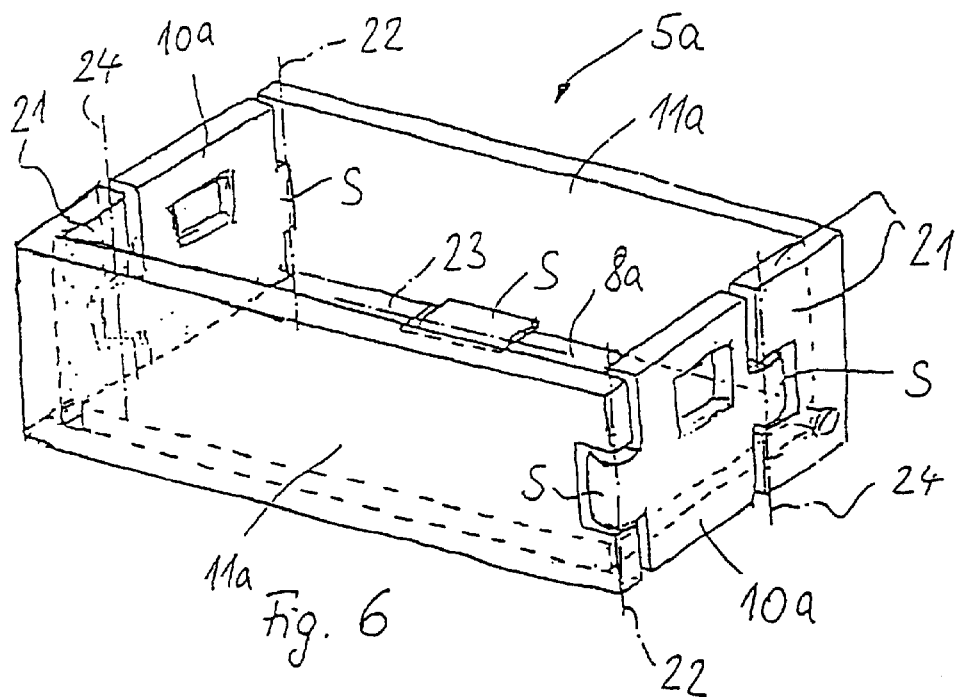

FIG. 1 shows in perspective representation an exemplified embodiment of a loading space in accordance with the invention for a passenger vehicle with a closable recess provided in a loading space floor;

FIG. 2 an exemplified embodiment of a box container in accordance with the invention which is incorporated in the recess of the loading space according to FIG. 1 and is represented in a partially mounted intermediate position;

FIG. 3 the box container according to FIG. 2 in the loading space according to FIG. 1, whereby the box container is shown in its mounted operational position;

FIG. 4 in enlarged perspective representation a section of a container side wall of the box container according to FIG. 3 in the area of a entering groove for a mechanical mounting aid for the box container;

FIG. 5 in perspective representation the loading space according to FIG. 1 in which the box container according to FIG. 3 is positioned;

FIG. 6 a further exemplified embodiment of a box container in accordance with the invention in its mounted operational position;

FIG. 7 a horizontal projection onto a box container similar to FIG. 6, and

FIG. 8 the box container according to FIG. 7 in its collapsed inoperative position.

A loading space of a passenger vehicle in accordance with FIGS. 1 through 3 and 5 represents a passenger vehicle trunk which can be closed off by a trunk lid in a manner inherently known to the art. The loading space 1 exhibits a loading space floor 2 in which, in accordance with FIGS. 2 and 3, a recess 6 is provided. The recess 6 is closed off by means of a cover in the form of two swivel lids 3, 4. The swivel lids 3, 4 are level in their closed position (FIGS. 1 and 5) and flush with the loading space floor 2. Both swivel lids 3 and 4 are, respectively, sluably mounted around a horizontal swivel axis extending in the longitudinal direction of the vehicle. A handle 7 is allocated to the right swivel lid 4 in the representation according to FIG. 1 by means of which the swivel lid 4 can be grasped by the hand and pulled upward.

In the recess 6 a box container 5 is recess-mounted in its collapsed inoperative position, whereby the height of the box container 5 in its collapsed inoperative position corresponds approximately to the depth of the recess between the underside of the closed swivel lids 3, 4 and the floor of the recess 6 The box container 5 can be removed from the recess 6 and used separately from the motor vehicle or loading space 1. The box container 5 exhibits several wall parts 8 through 11 which together define a closed, rectangular box shape of the box container 5. One wall part forms a container floor 8. The four other wall parts 9 through 11 represent the side walls rising up from the container floor 8. The container floor 8 exhibits a rectangular surface area. The side walls 9 through 11 are also rectangular in configuration. All wall parts 8 through 11 are dimensionally stable, preferably manufactured from impact-resistant plastic. All wall parts 8 through 11 are sluably connected to each other via hinge configurations 12, 13 At the same time the hinge configurations 12, 13 are selected in such a way that the wall parts 8 through 11 are parallelogrammatically mountable from the collapsed inoperative position and correspondingly again parallelogrammatically lowered from the mounted operational position.

Both opposing and narrow side walls forming the wall parts 9, 10 are sluably mounted on the container floor 8 via the corresponding hinge configurations around mutually parallel horizontal swivel axes 12. Both wall parts 11 forming the longitudinal sides are sluably connected in the area of the upper outside edges via universal joints 13 to the opposing side walls 9, 10 around two swivel axes 14, 15, whereby both swivel axes 14, 15 extend horizontally. The swivel axes 14 are aligned parallel to the swivel axes 12 and the swivel axes 15 at a right angle to the swivel axes 14. The height of the longitudinal sides forming the wall parts 11 is some less than half the width of the box container 8, such that the wall parts 11 can be swivel-positioned horizontally inward in a common plane (FIG. 2). In the collapsed inoperative position the wall parts 11 consequently lie in part on the side wall 10 and on the container floor 8. When the right side wall 9 in the representation according to FIG. 2 is swiveled up, the wall parts 11 and the opposing side wall 10 are parallelogrammatically raised along with it, whereby the wall parts 11 initially remain in their horizontal position because they bear on the inner side, still inclined for the time being, of the side wall 10. As soon as the side wall 9 has been mounted into vertical operational position, the wall parts 11 pivot downward into the mounted operational position according to FIG. 5, whereby they lock in position on the container floor 8.

In an exemplified embodiment of the invention not represented, corresponding lugs are provided on the container floor 8 as position-locking means which mesh with the corresponding, wedge-like recesses on the outsides of the wall parts 11 as soon as the wall parts 11 are slued downward. This prevents the wall parts 11 from being able to be pressed outward beyond the container floor 8, whereby the closed box shape of the box container 5 would be broken up. It is also possible to construct the universal joints 13 as position-locking means with corresponding stops or detents which prevent further swiveling beyond the vertical operational position.

Swiveling back into the lowered and collapsed inoperative position takes place in correspondingly converse manner in that the wall parts 11 are again folded inward and upward and the wall parts 9, 10 folded down in the shape of a parallelogram. The wall parts 11 are arranged in their operational position between the wall parts 9 and 10 in such a way that they support the wall parts 9, 10.

Lifting of the box container from its collapsed inoperative position into the mounted operational position takes place via a mechanical coupling 18, 19 by means of lifting the swivel lid 4. In this connection the swivel lid 4 exhibits on its underside, approximately at the same level as the handle 7, a locking tongue 18 which engages a corresponding entering groove 19. The locking tongue 18 is thus fit-positively engaged in the entering groove 19. As can be discerned with the aid of FIG. 4, the locking section of the locking tongue is able to slide downward through the entering groove 19 to an enlarged disengagement recess 20 whose width is greater than the locking section of the locking tongue 18. The length of the entering groove 19 and the positioning of the disengagement recess 20 are synchronized to the mounting movement of the box container 5 in such a way that the locking section of the locking tongue 18 glides, during mounting of the box container, downward along the entering groove 19 in the wall part 9 and in the mounted operational position has reached the level of the disengagement recess 20. Thereupon, the mechanical coupling automatically releases the box container 5 upon reaching the mounted operational position of the box container 5, such that the latter can be removed from the vehicle.

In order to secure the box container 5 in its position inside the recess 6, the container floor 8 exhibits circular recesses 17 into which corresponding support domes 16 serving as support elements extend, which recesses are positioned on the floor of the recess 6 and rise up vertically. In addition to the securing function of the box container 5, the support domes 16 are used in particular to support the swivel lids 3, 4, when the box container 5 has been removed, in the level, flush closing position in accordance with FIG. 1 or 5. The height of the support domes 16 consequently corresponds to the depth of the recess 6 between the underside of the swivel lids 3, 4 and the floor of the recess 6-referenced to the closed position of the swivel lids 3, 4. So that the support domes 16 does not hinder the collapsing of the box container 5 inside the recess 6, the one support dome 16 extends through a handle recess into the wall part 9 up to the underside of the swivel lid 4 and the other support dome 16 extends upward through the aperture remaining between the wall parts 11 in the horizontal inoperative position to the underside of the swivel lid 3. The advantage of the solution described is that the width of the box container 8 can be almost completely proportioned to the width of the recess 6. Alternatively, it is also possible to provide the recess with a wraparound frame or edge instead of the support domes 16, which frame or edge takes over the support of the swivel lids. In this case, however, the width of the box container may only still correspond to the distance remaining between the opposing edge or frame sections.

The box container according to FIGS. 6 through 8 likewise exhibits a rectangular box shape. With this box container 5a, the corresponding wall parts 8a, 10a, 11a are also sluably mounted vis-à-vis each other and movable between a collapsed inoperative position and a mounted operational position. Wall parts 10a, 11a are, however, parallelogrammatically sluably mounted around vertical swivel axes 22, 24. Corresponding hinge configurations S have been provided for this purpose. Between the wall parts 10a, 11a a wall part 8a forming the container floor can be folded in, which wall part is sluably mounted around a horizontal handle 23 by means of a hinge configuration S on a wall part 11a forming a longitudinal side wall. The wall part 8a forming the container floor is constructed as a single piece and, consequently, sluably mounted on one single wall part 11a only. The wall part 8a extends over the entire surface area of the box container 5a. To collapse the box container 5a from the operational position in accordance with FIG. 6, the wall part 8a forming the container floor is initially pivoted upward around its handle 23 and the hinge configuration S. Subsequently, the wall parts 11a, 10a are collapsed down to one side such that the collapsed inoperative position analogous to the representation according to FIG. 8 results. The wall parts 11a forming the longitudinal side walls are provided with angle prolongations 21 which extend at a right angle like an L profile in the direction of the wall sections 10a forming the short side walls. The length of the angle prolongations 21 is proportioned to the height of the wall part 8a forming the container floor in the collapsed inoperative position (FIG. 8). Exact, rectangular and sectional collapsing of the box container 5a is thereby possible. The wall part forming the container floor 8a is supported by position-locking means in its horizontal operational position on the wall part 11a lying opposite the hinge configuration S or on the opposing wall parts 10a. For this purpose, the wall parts 10a or 11a can exhibit correspondingly horizontal, inward extending support flanges on which the wall part 8a comes to rest in its horizontal operational position.

A correspondingly function-identical construction is represented by the box container 5b according to FIGS. 7 and 8. In addition to the corresponding support flanges 26 on the wall part 11, in this construction the wall part 8b forming the container floor further exhibits bearing sections 27 which, when the wall part 8b is collapsed downward, comes to rest on the support flanges 26. Other kinds of position-locking means can, however, also be used, in which case mechanically acting, fit-positive positioning means have proven themselves particularly advantageous. Thus, fitting or stop connections which can be easily released again by hand are provided in particular. Preferably, the releasing occurs without tools so that the mounting and collapsing of the box container can occur easily and quickly.

In order to facilitate the manual lifting of the swivel lid connected via the mechanical coupling to the collapsed box container out of its closed position, in an exemplified embodiment not shown, a support lever arrangement is provided which bears on the collapsed box container or on the floor of the recess via a central pivot point. The side of the support lever arrangement, which can be actuated via a push-button in the adjacent swivel lid, can be lowered like a whip, whereby the section opposite the pivot point of the support lever arrangement rises in whip-like manner. This section in turn engages the swivel lid provided with the coupling, whereby the latter is raised a specific value. As a result thereof, the front edge allocated plane of separation between both swivel lids can be grasped and the swivel lid raised with simultaneous mounting of the box container.

What is claimed is:

1. A motor vehicle having a loading space, the loading space comprising:
   a floor;
   a collapsible box container;
   at least one recess disposed beneath said floor, the recess being dimensioned to accommodate said collapsible box container when said collapsible box container is in its collapsed state;
   a door covering the recess that is flush with said floor when closed, said door incorporating at least one swivel lid;
   a mechanical coupling connecting the at least one swivel lid to at least one wall part of said collapsible box container, said door and said collapsible box container being operably connected in such a way that opening said swivel lid effects erection of said collapsible box container,
   the recess having a first plan area;
   the collapsible box container, when erected, having a second plan area that is contained entirely within the first plan area of the recess.

2. The motor vehicle according to claim 1, further comprising the mechanical coupling (18, 19) being mounted in a releasable manner between the swivel lid and the at least one wall part.

3. The motor vehicle according to claim 1, wherein on the floor of the recess (6) and/or on at least one swivel lid (3,4) at least one support element (16) is provided which creates a floor-flush support of the swivel lid (3,4) when the recess is empty.

4. The motor vehicle according to claim 3, further comprising at least one support element (16), operably configured to cooperatively engage at least one centering recess (17) is provided on the container floor of the box container (5) by means of which a defined positioning of the box container (5) in the recess (6) is achievable.

5. A motor vehicle having a loading space, the loading space comprising:
   a floor;
   a collapsible box container;
   at least one recess disposed beneath said floor, the recess being dimensioned to accommodate said collapsible box container when said collapsible box container is in its collapsed state;
   a door covering the recess that is flush with said floor when closed, said door incorporating at least one swivel lid;
   a mechanical coupling connecting the at least one swivel lid to at least one wall part of said collapsible box container, said door and said collapsible box container being operably connected in such a way that opening said swivel lid effects erection of said collapsible box container,
   the mechanical coupling (18, 19) being mounted in a releasable manner between the swivel lid and the at least one wall part.

6. A motor vehicle having a loading space, the loading space comprising:
   a floor;
   a collapsible box container;
   at least one recess disposed beneath said floor, said recess dimensioned to accommodate said collapsible box container when said collapsible box container is in its collapsed state, said floor of said recess incorporating at least one support element which creates a floor-flush support for said swivel lid when said recess is empty;
   a door covering said recess, said door being flush with said floor when said door is closed, said door incorporating at least one swivel lid that is connected in a releasable manner via a mechanical coupling to at least one wall part of said collapsible box container, said door and said collapsible box container connected in such a way that opening said swivel lid effects erection of said collapsible box container,
   the recess having a first plan area; the collapsible box container, when erected, having a second plan area that is contained entirely within the first plan area of the recess.

7. A motor vehicle having a loading space, the loading space comprising:
   a floor;
   a collapsible box container;
   at least one recess disposed beneath said floor, said recess dimensioned to accommodate said collapsible box container when said collapsible box container is in its collapsed state, said floor of said recess incorporating at least one support element which creates a floor-flush support for said swivel lid when said recess is empty;
   a door covering said recess, said door being flush with said floor when said door is closed, said door incorporating at least one swivel lid that is connected in a releasable manner via a mechanical coupling to at least one wall part of said collapsible box container, said door and said collapsible box container connected in such a way that opening said swivel lid effects erection of said collapsible box container, further comprising:
    at least one centering recess, on the base of said collapsible box container, operably configured to cooperatively engage the at least one support element to allow defined positioning of said collapsible box container within said recess.

8. A method for using a collapsible box container, the method comprising:
    creating a recess below the floor of a loading space of a motor vehicle, said recess being sized to house a collapsible box container;
    providing a collapsible box container that is configured to be wholly received within the recess when the collapsible box container is collapsed, and to sit within the recess when the collapsible box container is erected,
    covering the recess with at least one door that is flush with the floor of the loading space when closed;
    interconnecting the collapsible box container with the door in a manner that, when the door is opened, the box automatically erects and sets in a stable position.

9. The method according to claim 8, further comprising the step of:
    interconnecting the collapsible box container with the door in a detachable manner that allows the collapsible box container to be detached once it is fully erected.

10. The method according to claim 8, further comprising the step of:
    placing supports in the recess that keep the doors flush with the floor of the loading space even when the recess is empty.

* * * * *